United States Patent
Chen et al.

(10) Patent No.: US 9,998,514 B2
(45) Date of Patent: Jun. 12, 2018

(54) METHOD AND APPARATUS FOR HANDLING FILES IN ASSOCIATION WITH MEDIA CONTENT DELIVERY

(71) Applicant: Telefonaktiebolaget L M Ericsson (publ), Stockholm (SE)

(72) Inventors: Kun Chen, Shanghai (CN); Thorsten Lohmar, Aachen (DE); Michael John Slssingar, Skärholmen (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 211 days.

(21) Appl. No.: 14/651,460

(22) PCT Filed: Jan. 30, 2013

(86) PCT No.: PCT/SE2013/050077
§ 371 (c)(1),
(2) Date: Jun. 11, 2015

(87) PCT Pub. No.: WO2014/092624
PCT Pub. Date: Jun. 19, 2014

(65) Prior Publication Data
US 2015/0319210 A1 Nov. 5, 2015

(30) Foreign Application Priority Data
Dec. 12, 2012 (WO) ............... PCT/CN2012/086411

(51) Int. Cl.
*G06F 15/16* (2006.01)
*H04L 29/06* (2006.01)
(Continued)

(52) U.S. Cl.
CPC .......... *H04L 65/602* (2013.01); *H04L 1/0042* (2013.01); *H04L 65/4084* (2013.01);
(Continued)

(58) Field of Classification Search
CPC . H04L 65/602; H04L 1/0042; H04L 65/4084; H04L 65/605; H04L 67/02
(Continued)

(56) References Cited

U.S. PATENT DOCUMENTS

2012/0259994 A1* 10/2012 Gillies ............... H04L 12/1881
709/231
2013/0144986 A1* 6/2013 Yamada ............... H04H 20/16
709/219

OTHER PUBLICATIONS

International Search Report, PCT International Application No. PCT/SE2013/050077, dated Oct. 21, 2013.
(Continued)

*Primary Examiner* — Alan S Chou
(74) *Attorney, Agent, or Firm* — Sage Patent Group (57) ABSTRACT

A method is disclosed for execution by an apparatus of a multimedia delivery system when distributing streamed media content via UDP. The method includes receiving media content, distributed in a plurality of files, from at least one media source, and identifying, from the received files, associated files including at least one audio file and at least one video file. The method further includes combining the associated files into one source block and encoding the content of the source block. A manifest file describing the content of the source block is then generated. The manifest file and the associated source block are transmitted. Related methods for decoding and separating the combined files in a UE are also provided.

22 Claims, 5 Drawing Sheets (51) Int. Cl.

| | | |
|---|---|---|
| *H04L 1/00* | (2006.01) | |
| *H04L 29/08* | (2006.01) | |
| *H04N 21/2362* | (2011.01) | |
| *H04N 21/2368* | (2011.01) | |
| *H04N 21/434* | (2011.01) | |
| *H04N 21/845* | (2011.01) | |
| *H04N 21/854* | (2011.01) | |

(52) U.S. Cl.
CPC .......... *H04L 65/605* (2013.01); *H04L 65/607* (2013.01); *H04L 67/02* (2013.01); *H04L 69/164* (2013.01); *H04N 21/2362* (2013.01); *H04N 21/2368* (2013.01); *H04N 21/4341* (2013.01); *H04N 21/4345* (2013.01); *H04N 21/8456* (2013.01); *H04N 21/85406* (2013.01)

(58) Field of Classification Search
USPC .......................................................... 709/219
See application file for complete search history.

(56) References Cited

OTHER PUBLICATIONS

Written Opinion of the International Searching Authority, PCT International Application No. PCT/SE2013/050077, dated Oct. 21, 2013.

3GPP, Technical Specification, "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 11)", 3GPP TS 26.247 V11.1.0 (Dec. 2012), 133 pp.

Bouazizi "DASH Delivery over MBMS", International Organisation for Standardisation—ISO/IEC JTC1/SC29/WG11—Coding of Moving Pictures and Audio, MPEG2012/M2xxxx, Shanghai, Oct. 12, 2012, 4 pp.

Sodagar, "The MPEG-DASH Standard for Multimedia Streaming Over the Internet", *IEEE MultiMedia*, vol. 18, No. 4, Oct.-Dec. 2011, pp. 62-67.

* cited by examiner

METHOD AND APPARATUS FOR HANDLING FILES IN ASSOCIATION WITH MEDIA CONTENT DELIVERY

CROSS REFERENCE TO RELATED APPLICATION

This application is a 35 U.S.C. § 371 national stage application of PCT International Application No. PCT/SE2013/050077, filed on 30 Jan. 2013, which itself claims priority to PCT International Application No. PCT/CN2012/086411, filed on 12 Dec. 2012, the disclosures and contents of which both of which are incorporated by reference herein in their entirety. The above-referenced PCT International Application was published in the English language as International Publication No. WO 2014/092624 A1 on 19 Jun. 2014.

TECHNICAL FIELD

The present disclosure relates to a method for distributing, and a method for receiving, media content and an apparatus and UE, respectively, for executing such a respective method.

BACKGROUND

Adaptive Hypertext Transfer Protocol (HTTP) streaming is becoming a dominant content streaming technique, where HTTP live streaming (HLS), Smooth streaming (IMS) and 3GP Moving Picture Experts Group Dynamic Adaptive Streaming over HTTP (MPEG-DASH HTTP) are but some examples of existing techniques adapted for such distribution of content.

Those adaptive HTTP streaming techniques all have a common principle, namely that a client receives a content stream as a sequence of files, or media segments, as a sequence of byte-range requests, which are then decoded and played out as a continuous media stream Uniform Resource Locators (URLs) of a file sequence are described in a manifest file which is referred to as a .m3u8 playlist when used for HLS, an .ismc when used for ISM and a Media Presentation Description (MPD) when used for DASH.

A client of a user equipment (UE) may, after having acquired a manifest file, acquire one file after the other, as described in the manifest file. During file download, the client estimates the available link bit rate or the download speed, and depending on the difference between the available link bit rate and the encoded bit rate of the acquired media, the client can select an appropriate representation, which is typically slightly lower than the measured bit rate.

To prepare a continuous media stream of content which is suitable for HTTP streaming, the media stream is segmented into files, or media segments, on the server side, from which the media content is distributed, while, on the client side, these media segments are fetched one-by-one as independent files. The client may then play the files contiguously, thereby providing a continuous stream playout.

Multimedia Broadcast Multicast Services (MBMS) is a point-to-multipoint interface specification for existing and upcoming 3GPP cellular networks which is designed to provide efficient delivery of broadcast and multicast services, both within a cell as well as within the core network, such as e.g. Wideband Code Division Multiplex (W-CDMA), Enhanced Data Rates for Global System Global System for Mobile Communication (GSM) Evolution (EDGE), General Packet Radio Service (GPRS), Code Division Multiple Access 2000 (CDMA2000). Evolved Multimedia Broadcast Multicast Services (eMBMS) is a corresponding specification adapted for Evolved Packet Systems, including (Evolved Universal Terrestrial Radio Access Network) (E-UTRAN) or Long Term Evolution-System Architecture Evolution (LTE-SAE).

One typical use case for use of any of these specifications may be to deliver sport game video content to a large number of mobile phone users which are gathered in a sports stadium or any other location which is attracting a lot of people at the same time. MBMS or eMBMS can use the User Datagram Protocol/protocol via File delivery over Unidirectional Transport (UDP/FLUTE), as specified in RFC 3926, HLS or DASH as a Download Delivery Method to deliver live TV content to the mobile phones. Also popular files, such as e.g. Android updates, YouTube clip pre-loadings, or major news events may efficiently be distributed to a large number of recipients in this way.

Figure 1:
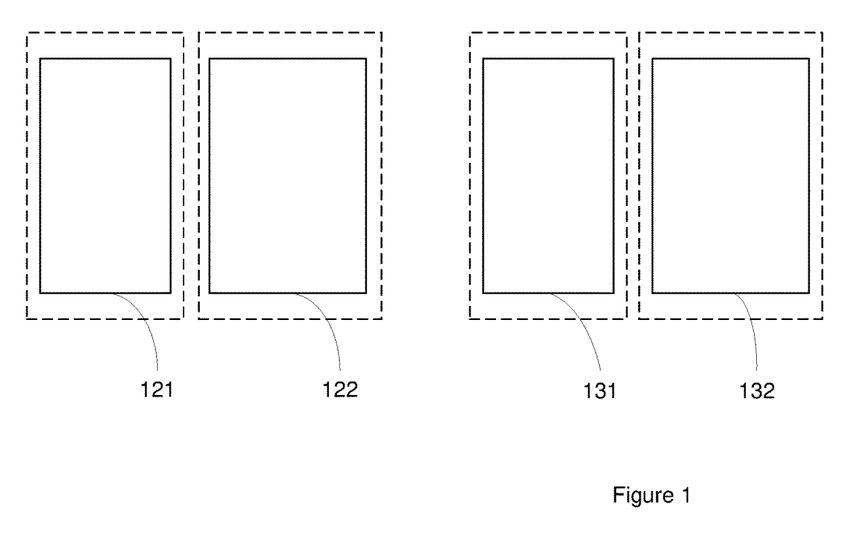
FIG. 1 is a simplified illustration of files arranged according to the prior art.

According to the DASH specification, 3GPP TS 26.246 a 3GP/MPEG DASH encoder can generate audio and video tracks for one single streaming session in different files, as indicated in FIG. 1, where a first audio file 121 is separated from a first video file 122, and a second audio file 131 is separated from a second video file 132.

Figure 2:
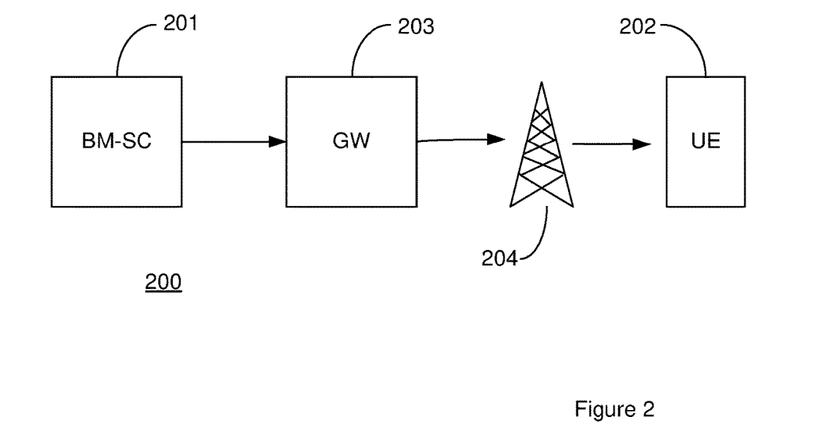
FIG. 2 is a simplified illustration of an MBMS network according to the prior art.

FIG. 2 is a simplified illustration of a MBMS system 200, where a Broadcast Multicast Service Center (BM-SC) 201 is distributing media content to User Equipments (UEs) 202, such as e.g. mobile devices or any other type of MBMS enabled User Equipment, via a Gateway (GW) 203 and an eNB 204.

In case DASH files are sent via an MBMS delivery system, the BM-SC will continuously transmit DASH files provided from the GW through a FLUTE session and typically a Forward Error Correction (FEC) redundancy level will apply on each file in order to increase the reliability of the FLUTE session.

There are, however, several drawbacks with sending DASH files with separate audio and video tracks in separate files over MBMS file delivery, especially since the audio file size is commonly relatively small, which results in that the BM-SC will need to apply separate FEC encoding on the audio files and the video files. Audio files are commonly more prone to losses than video files due to its relatively small size. A 2 second long audio file with 32 kbps will e.g. result in a 8 kbyte audio file. If the BM-SC applies a 10% FEC redundancy level and the encoding symbol size is 1024 bytes, 11 encoding symbols will be delivered by the BM-SC in the session. In case any two encoding symbols are dropped during distribution, the UE will not be able to recover the audio file.

In addition, from a UE point of view the excessive FEC decoding which is required for capturing all files will have a negative impact on the battery consumption.

Therefore, there is a desire to find a more efficient way of distributing media content comprising both audio and video files.

SUMMARY

An object of this disclosure is to address the problem mentioned above, and for that reason, according to a first aspect, a method is disclosed which is executed by an apparatus of a multimedia delivery system when distributing streamed media content via UDP, where such a method comprises: receiving media content distributed in a plurality of files from at least one media source; identifying, from the received files, associated files comprising at least one audio file and at least one video file; combining the associated files into one source block; encoding the content of the source block; generating a manifest file describing the content of the source block, and transmitting the manifest file and the associated source block.

In order to enhance the encoding the encoding typically includes FEC encoding.

The identifying typically comprises identifying at least one audio file and at least one video file associated with the same streaming, wherein the at least one audio file is provided in an audio track and the at least one video file is provided in a video track separated from the audio track, or identifying at least one audio file and at least one video file associated with the same streaming on the basis of a pattern providing instructions to combine said at least one audio file and at least one video file. Thereby, the suggested method may easily be used only when required, while otherwise a conventional method may be used.

The generating typically comprises adding an element describing the combined files to the manifest file, where the added element is arranged such that its content enable subsequent splitting of the content of the source block into the at least one audio file and at least one video file as originally identified.

The suggested method may typically be applied when the media content is distributed according to the Hypertext Transfer Protocol, HTTP, streaming protocol, wherein the manifest file is typically an FDT instance.

In a typical scenario, the media content is delivered via UDP/FLUTE, wherein the apparatus is, or form part of, a Broadcast Multicast Service Center, BM-SC.

According to a second aspect an apparatus capable of executing the method described above is provided. More specifically an apparatus of a multimedia delivery system capable of distributing streamed media content via UDP is provided. The apparatus comprise a processor and a memory, where the memory comprises instructions which when executed by the processor causes the processor to execute the method as described above.

According to a third aspect a computer program product is provided which comprises computer readable medium and a computer program, where the program comprises the instructions as described above.

According to a fourth aspect a method executed in a EU, when receiving streamed media content via UDP, is provided. Such a method comprise: receiving a manifest file and a source block; identifying, according to content of the manifest file, the source block as a block comprising a combination of at least one audio file and at least one video file; providing the at least one audio file and at least one video file by decoding and splitting the source block into the at least one audio file and at least one video file, on the basis of content of the manifest file.

Both the decoding and splitting may be based on content of an element comprised in the manifest file, the element being arranged such that the respective at least one audio file and at least one video file contained in the source block can be identified.

According to a fifth embodiment a UE capable of receiving streamed media content via UDP is provided, where the UE comprise a processor and a memory, where the memory comprises instructions which when executed by the processor causes the processor to execute the method executed in a UE, as suggested above.

According to a sixth aspect a computer program product comprising computer readable medium and a computer program comprising the instructions executable on a UE as suggested above, as provided.

According to a seventh aspect an apparatus of a multimedia delivery system capable of distributing media content via UDP is provided. Such an apparatus comprise: a receiving unit configured to receive media content distributed in a plurality of files from at least one media source; a processing unit configured to identify, from the received files, associated files comprising at least one audio file and at least one video file, and to initiate a combining unit to combine the associated files into one source block, and an encoding unit to encode content of the source block. The processing unit is also configured to generate a manifest file, such that the manifest file is describing the content of the source block, and to transmit the source block and the manifest file, via a transmitting unit.

The encoding unit may be configured to execute FEC encoding when performing the suggested encoding.

The processing unit may also be is configured to identify at least one audio file and at least one video file associated with the same streaming, wherein the at least one audio file is provided in an audio track and the at least one video file is provided in a video track separated from the audio track, or to identify at least one audio file and at least one video file associated with the same streaming on the basis of a pattern providing instructions to combine said at least one audio file and at least one video file.

The processing unit may be configured to add an element to the manifest file when generating the manifest file, said element being arranged such that its content enable subsequent splitting of content of the source block into the at least one audio file and at least one video file as originally identified.

The apparatus may be configured to distribute media content according to the HTTP streaming protocol, and the manifest file may be an FDT instance.

Furthermore, the apparatus may be configured to deliver media content via UDP/FLUTE.

The apparatus described above may be, or form part of, a BM-SC, or any other type of apparatus providing corresponding functionality.

According to an eights aspect a UE capable of receiving streamed media content distributed via UDP is provided, where the UE comprise: a receiving unit configured to receive a manifest file and a source block; a processing unit configured to identify, according to content of the manifest file, the source block as a block comprising a combination of at least one audio file and at least one video file, and to provide at least one audio file and at least one video file by initiating decoding of the source block at a decoding unit and splitting of the source block into said at least one audio file and at least one video file at a splitting unit, the decoding and splitting being based on content of the manifest file.

The suggested UE may be configured to execute FEC encoding.

The processing unit may be configured to provide the at least one audio file and at least one video file into a storing unit.

Furthermore, the UE may typically be connectable to a media player, which is capable of accessing and presenting a video on the basis of the at least one audio file and at least one video file.

The UE may be configured to receive media content according to the HTTP, streaming protocol, and the manifest file may be an FDT instance.

In addition, the UE may be configured to receive media content delivered via UDP/FLUTE.

Further details of features and embodiments will be described in more detail below.

BRIEF DESCRIPTION OF DRAWINGS

Embodiments will now be described in more detail in relation to the accompanying drawings, in which.

DETAILED DESCRIPTION

Returning again to the MBMS related example given above, with audio files having a size of 8 kbytes, a file size of 800 kbytes which is effected by two dropped encoding symbols are easily recovered by the UE having a 10% FEC, and thus if one could avoid transmission of small size files, which are common among audio files, a more efficient and robust media distribution system would be available for distribution of a combination of audio and video files.

Figure 3:
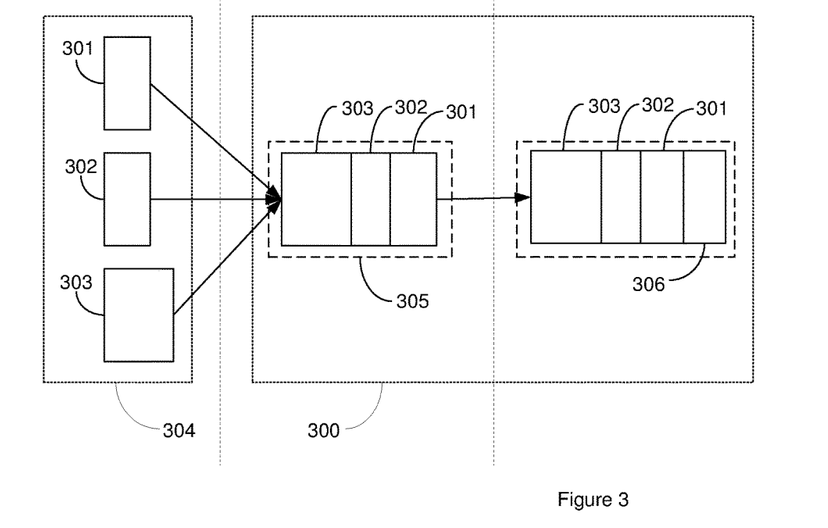
FIG. 3 is an illustration of a sequence for combining files according to one embodiment.

It is therefore suggested that instead of sending audio and video files of a streamed media session, typically a streamed HTTP session, in separate files, audio and video files are combined together. A sequence, describing how files belonging to the same streaming or session can be handled on the server or transmitting side is schematically illustrated in FIG. 3, where 1) media content provided to a node capable of encoding media content, here represented by a server 300 such as e.g. a BM-SC, as separate files, here represented by two audio files 301,302 and one video file 303, from a Live Encoder (LE) 304 is 2) combined into one file, from hereinafter referred to as a source block 305. Once the files have been combined into one single block, the source block 305 can be 3) encoded, typically by applying FEC encoding 306 on the source block, instead of separately on each file, as would be required if the files were to be treated as separate files. After the encoding the source block is ready for transmission (not shown).

More specifically, a method is suggested which, when executed in an apparatus which is capable of encoding received files, is also capable of combining audio and video files into one single block. As mentioned above, such an apparatus may e.g. be or form part of a BM-SC. By performing such a combination, a more reliable transmission can be obtained, since separate encoding of small audio files thereby is avoided the apparatus. In addition the time required for encoding on the server or transmitting side, as well as the time required for decoding on the UE or receiving side are also reduced due to less encoding and decoding, respectively. This reduction is especially valuable for real-time transmissions.

Such a method will now be described with reference to FIG. 4, where in a first step 4:1, media files, which comprise at least one audio file and at least one video file, are received from a LE or any other node capable of providing media content to the apparatus. No modification of such a node will be required, and this any LE or corresponding unit which can be used in presently known media distribution networks may be used also when applying the method as described herein.

In a next step 4:2, audio and video files are identified as files belonging to the same streaming, but provided via separate tracks, i.e. an audio track and a video track. Alternatively, a pattern indicating how to combine received files may be used for identifying the files as associated files which should be combined. Such a pattern may be provided from an external node, which in case of MBMS may be e.g. a Broadcast Manager (EMBM). In another step 4:3, the files which are identified as being associated with each other are combined, such that they form one single file object, a source block, comprising a composition of the one or more audio file and the one or more associated video file.

In another step 4:4, the source block is encoded, typically by applying FEC encoding over the source block.

In association with assembling the source block the manifest file, which for an UDP/FLUTE session is represented by an FDT instance, which may also be referred to as a FLUTE FDT instance XML document, is generated, as indicated in step 4:5. In order to enable a client of a UE to handle and process the source block correctly the manifest file has to be adapted accordingly. This can be achieved by adding a new element, describing the content of the source block, to the manifest file.

The source block, comprising the combined files, and the manifest file are transmitted, e.g. via the BM-SC, thereby enabling any MBMS or eMBMS enabled UE to receive the manifest file and the source block and to use the content of the manifest file to reconstruct the files as they were arranged before the combination, as indicated in step 4:6.

According to one exemplary embodiment, where the manifest file is an FDT instance, the "FileType" of the FDT instance comprise a new element, here referred to as "mbms2012: combinedContents", which, when identified at a UE, indicates to the UE that the session described by the FDT instance comprise combined content which can be separated into its original composition on the basis of instructions of the FDT instance.

```
<xs:complexType name="FileType">
    <xs:sequence>
        <xs:element ref="mbms2007:Cache-Control"
        minOccurs="0"/>
        <xs:element ref="sv:delimiter"/>
        <xs:element ref="mbms2012: combinedContents"
        minOccurs="0"/>
            <xs:element ref="sv:delimiter"/>
            <xs:any namespace="##other" processContents="skip"
minOccurs="0" maxOccurs="unbounded"/>
            <xs:element name="Group" type="mbms2005:groupIdType"
minOccurs="0" maxOccurs="unbounded"/>
            <xs:element name="MBMS-Session-Identity"
type="mbms2005:MBMS-Session-Identity-Type" minOccurs="0"
maxOccurs="unbounded"/>
    </xs:sequence>
```

More specifically, the new element "mbms2012:combinedContents" may be specified as follows:

```
<?xml version="1.0" encoding="UTF-8"?>
<xs:schema
        xmlns="urn:3GPP:metadata:2012:MBMS:FLUTE:FDT"
        xmlns:xs="http://www.w3.org/2001/XMLSchema"
        targetNamespace="urn:3GPP:metadata:2012:MBMS:FLUTE:FDT"
        elementFormDefault="qualified">
        <xs:element name="combinedContents">
           <xs:complexType>
              <xs:sequence>
                 <xs:element name="subContent" type="xs:complexType"
minOccurs="0" maxOccurs="unbounded"/>
              </xs:sequence>
           </xs:complexType>
        </xs:element>
        <xs:complexType name=" subContent">
        <xs:attribute name="subContent-Location" type="xs:anyURI"
   use="required"/>
           <xs:attribute name="subContent-Length" type="xs:unsignedLong"
use="required"/>
        </xs:complexType>
</xs:schema>
```

One example of how a source block comprising combined files, can be described using the "mbms2012combinedContents" element presented above, is given below.

```
<File
   Content-Type="application/octet-stream"
   Content-Length="42000"
   Transfer-Length="42000"
   TOI="2"
   FEC-OTI-Encoding-Symbol-Length="16"
   FEC-OTI-Scheme-Specific-Info="AAEBBA=="
   Content-Location =
   "http://www.example.com/streaming/mediaseg1.data">
   <mbms2012:combinedContents>
      <mbms2012:subContent
      subContent-Length="1000"
      subContent-Location
      ="http://www.example.com/streaming/audio1/1.3gs">
      </mbms2012: subContent>
        <mbms2012:subContent
        subContent-Length="1000"
        subContent-Location
        = "http://www.example.com/streaming/audio2/1.3gs">
      </mbms2012: subContent>
      <mbms2012:subContent
         subContent-Length="40000"
         subContent-Location
         ="http://www.example.com/streaming/video/1.3gs">
      </mbms2012: subContent>
    </mbms2012: combinedContents>
</File>
```

In the given example, media content has been combined into one sourceblock and is referred to as "mediaseg1.data". mediaseg1.data comprises a combination of two audio files located at http://www.example.com/streaming/audio1/1.3gs and at http://www.example.com/streaming/audio2/1.3gs and one video file located at http://www.example.com/streaming/video/1.3gs.

Figure 4:
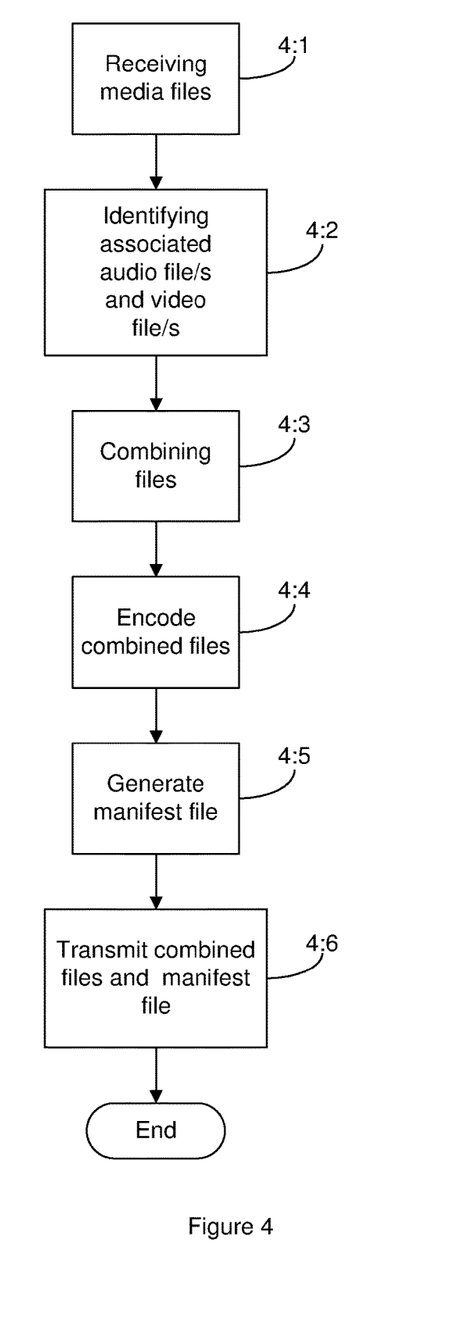
FIG. 4 is a flow chart illustrating a method for combining files according to one embodiment.

As indicated in FIG. 4, the source block, comprising the combined files, and the FDT instance are transmitted, here via the BM-SC, thereby enabling any MBMS or eMBMS enabled UE to receive the FDT instance and the source block and to use the content of the FDT instance to reconstruct the files as they were arranged before the combination, as indicated in step 4:6.

Figure 5:
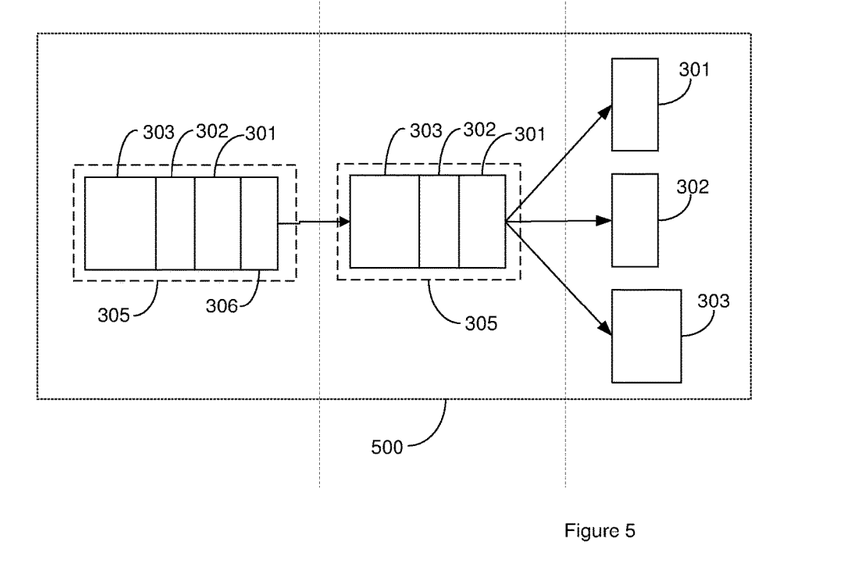
FIG. 5 is an illustration of a sequence for splitting combined files according to one embodiment.

FIG. 5 is a schematic illustration of sequences which are to be executed in a receiving unit 500, here referred to as a UE, which may e.g. be a UE configured as an UDP/FLUTE receiver, receiving a source block, such as the one described above. The received source block 305 is 1) decoded, here by applying FEC decoding on the combined file content, rather than on each file, as would have been the case if no combination of files had been done on the server side. The UE if informed of this way of decoding from the information in the new elements of the associated manifest file which is also received by the UE, such that, after decoding, 2) each of the files which were originally fed to the BM-SC on the server or transmitting side are identified and 3) separable.

Once separated the files can be handled in a conventional way, and, thus, if these files are provided to a HTTP or file system (not shown), which is common practice at this stage, any player (not shown) which is comprised in, or connected to the UE, will be able to play our the media content without requiring any amendments to the player with respect to the described file combination process. For this reason, a player adapted to play out video based media content by applying e.g. the DASH standard will not require any adaptation at all as long as a UE is executing the steps described in FIG. 5, provided that a delivery method according to the UDP/FLUTE protocol is used for the transmission.

Figure 6:
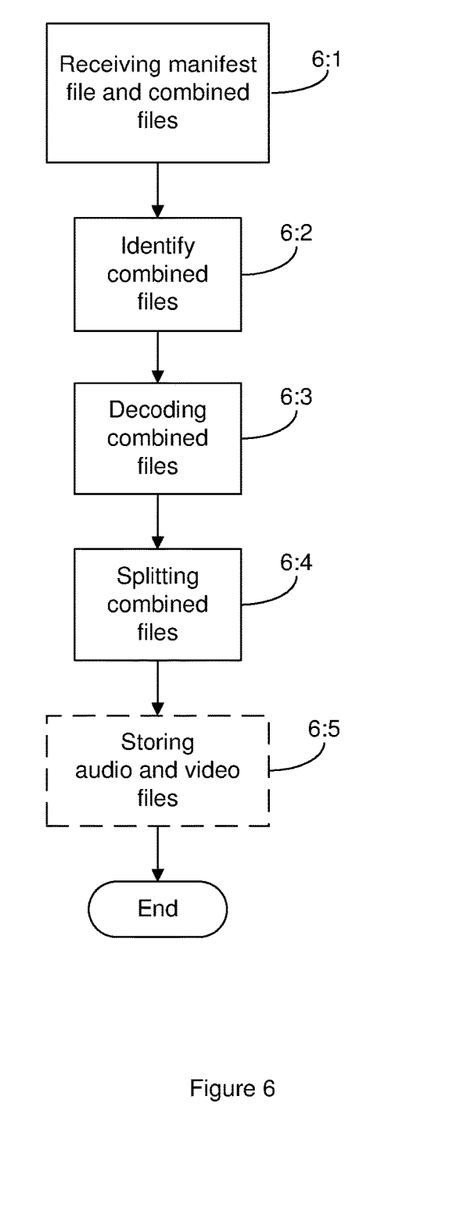
FIG. 6 is a flow chart illustrating a method for splitting combined files according to one embodiment.

A method which can be executed in a UE which is receiving a source block, such as the one mentioned above, will now be described in further detail with reference to FIG. 6. In a first step 6:1 the UE receives combined files comprised in a source block and an associated manifest file, after which the combined files can be identified on the basis of content, or more specifically content of the news element, of the manifest file, as indicated with step 6:2. The content of the manifest file enables the UE to decode the combined files by applying decoding, here FEC decoding, on combined content level, as indicated with step 6:3. Following the decoding the content of the source block is split up into audio files and video files provided in a format corresponding to the format the files had before the combination. The splitting of combined files is illustrated with step 6:4. At this stage a player having access to the files will recognise the files as conventional audio and video files respectively, and will be able to play out the media content of the files. This is due to the fact that as long as the UE is capable of executing a method such as the one described above, the file combination procedure as described herein will not have any impact on a media player which is fetching audio and video files processed by the UE. In a next step 6:5 the files are stored for retrieval of any type of suitable media player, such as e.g. a DASH player.

Figure 7:
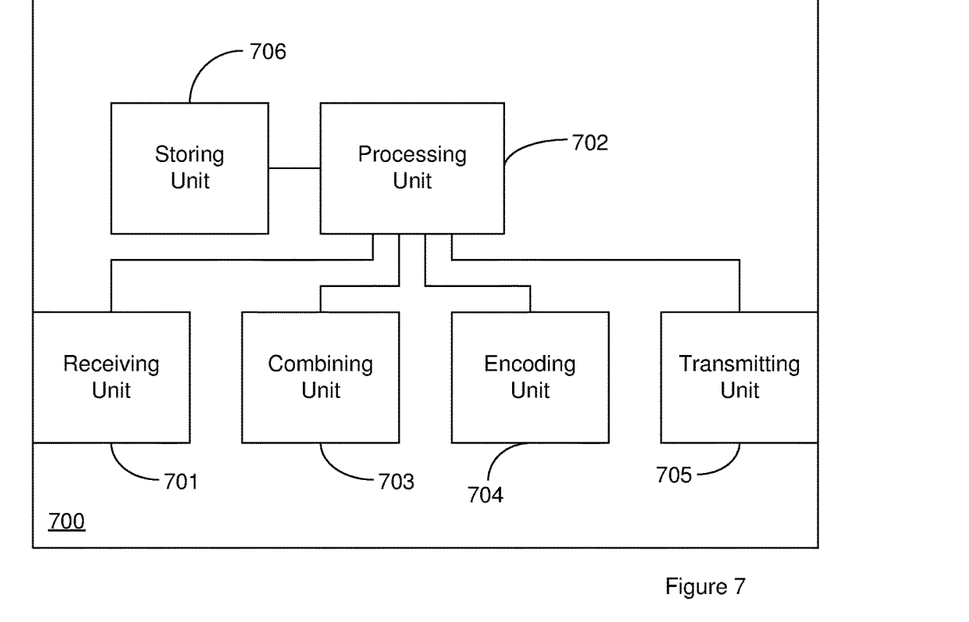
FIG. 7 is a block scheme illustrating an apparatus suitable for combining files according to a first embodiment.

An apparatus capable of combining audio and video files as suggested above will now be described with reference to FIG. 7. The described apparatus may typically be, or form part of, a BM-SC, or any other type of node which is configured to distribute media content sessions comprising separate tracks for audio and video files. It is to be understood that the apparatus described in FIG. 7 is a simplified arrangement, where additional functional units which are typically comprised in nodes, such as e.g. BM-SCs used in the described context, which are not necessary for the understanding of the file combination mechanism as described herein have been omitted for simplicity reasons. The same goes for the UE which will be described below with reference to FIG. 8, as well as the alternative embodiments, described with reference to FIGS. 9 and 10.

The apparatus 700 of FIG. 7 comprises a receiving unit 701, which is configured to receive audio and video files provided from a LE (not shown) or any other node or entity capable of providing media content comprising audio and video files. The UE 700 also comprises a processing unit 702, operatively connected to the receiving unit 701, a combining unit 703, an encoding unit 804 and a transmitting unit 705. The processing unit 701 is configured to identify associated files, comprising at least one audio file and at least one video file, from the received files, and, thus, to consider them as associated files; to initiate the combining unit 703 to combine the associated files into one single file object, or source block, and to initiate the encoding unit 704 to encode the content of the source block, rather than encoding each file of the source block separately. The processing unit 700 is also configured to generate a manifest file, such as e.g. an Manifest file, such that, the modified manifest file is describing how the audio and video files now combined into one source block, are arranged and, thus, how this source block can later be split up at a UE to the audio and video files as originally identified by the apparatus.

As already implied above, the processing unit 701 may, according to one embodiment be configured to identify associated files by detecting that one and a same streaming session comprises separate tracks for audio and video files, i.e. it identifies audio and video files which belong to the same media time. According to another embodiment, the processing unit 701 may instead be to identify and initiate combination of files based on a pattern, which may be referred to as a combination pattern. Such a pattern may be provisioned from an external node, such as e.g. an EMBM. Typically such a pattern comprise file names of audio and vide files which belong to the same media time.

The encoding unit 704 is typically configured to apply FEC encoding on the source block, such that, instead of applying FEC encoding on each of the associated and combined files, FEC encoding is applied on the source block, thereby obtaining a combined file which stands better chances of being successfully decoded at a UE, compared to if each file would have been encoded separately. The apparatus 700 typically also make use of a storing unit 706 for storing data during processing.

A UE capable of processing and handling files which have been combined as described above, will now be described in further detail with reference to FIG. 8. The UE may be e.g. a smart phone, tablet, desktop computer, laptop computer, TV ser-top box, an Internet connected television set, or any other type of device which has been configured accordingly. As already exemplified with a above, such a UE may e.g. be a UE which is configured to handle sessions distributed via MBMS, such as e.g. the UDP/FLUTE enabled UE mentioned above, and may in such a case be referred to as a FLUTE receiver.

Figure 8:
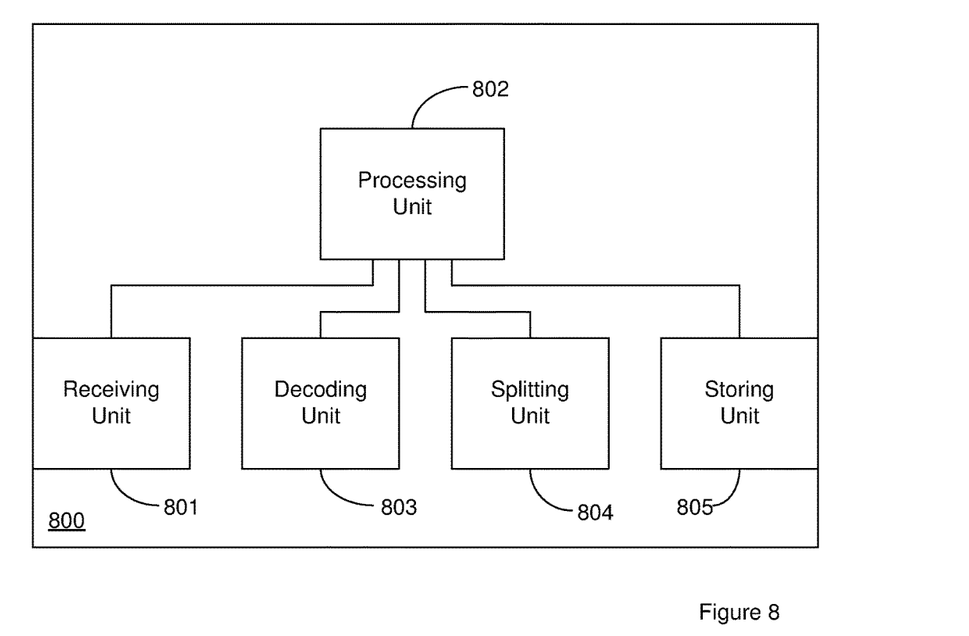
FIG. 8 is a block scheme illustrating a UE suitable for receiving ans splitting combined files according to one embodiment.

The UE 800 of FIG. 8, comprises a receiving unit 801 which is configured to receive a manifest file, such as e.g. an FDT instance, or more specifically an updated FDT instance, and a source block, i.e. a file comprising a combination of at least one audio file and at least one video file, where the combination is identifiable from content of the manifest file, provided in a new element of the manifest file. The UE also comprises a processing unit 802 which is operatively connected to the receiving unit 801, a decoding unit 803, a splitting unit 804 and a storing unit 805. The processing unit 802 is configured to identify the received source block as a block, comprising a combination of at least one audio file and at least one video file, on the basis of the content of manifest file. The processing unit 802 is also configured to provide at least one audio file and at least one video file from the content of the source block, by initiating decoding of the source block at the decoding unit 803 and splitting of the provided at least one audio file and at least one video file at a splitting unit 804. The splitting unit 804 is configured to split the source block based on content of the manifest file. Typically FEC encoding is applied the source block at the server or transmitting end, the, thus, the decoding unit 803 is therefore typically configured to apply FED decoding on the source block.

It is to be understood that the apparatus and UE as described above, with reference to FIGS. 7 and 8, respectively, merely illustrates various functional units which have been combined in a logical sense and that these functional units may be implemented using any suitable hardware circuits or arrangements, such as e.g. on one or more Application Specific Integrated Circuit (ASIC) configurations.

Typically the UE 800 is also provided with storing facilities, here represented by storing unit 805, which may be arranged such that audio and video files which have been recovered from a source block are can be copied into a predefined folder, from where a media player, such that e.g. any conventional DASH player may be able to fetch the files transparently.

Figure 9:
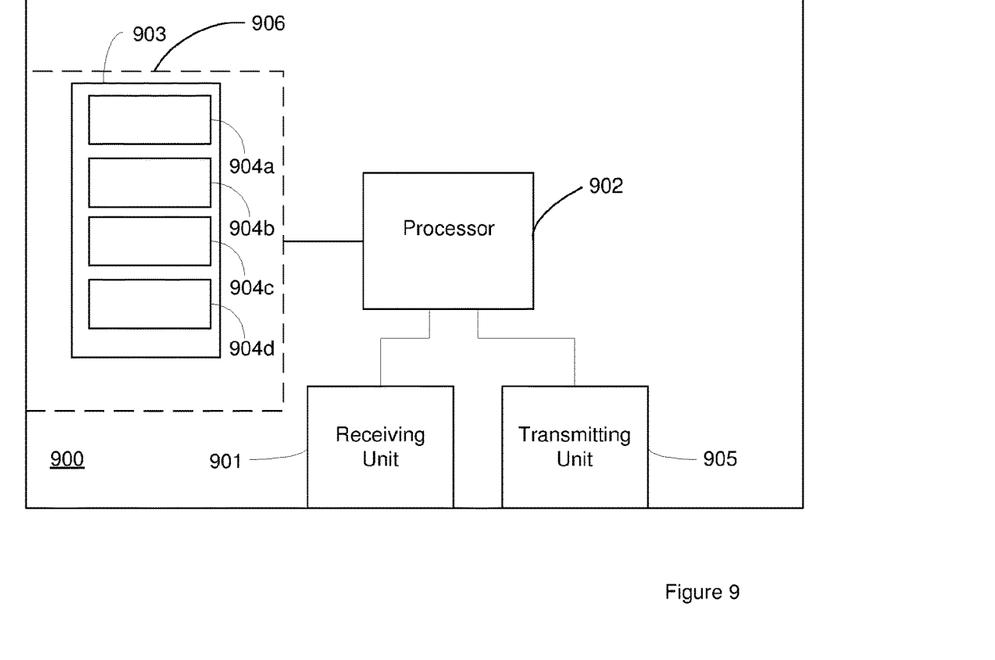
FIG. 9 is another block scheme illustrating an apparatus suitable for combining files according to a second embodiment.

An apparatus for distributing combined media content may alternatively be implemented as a software based configuration, such that the method as described above with reference to FIG. 4 is instead executed by a processor running executable instructions. Such an apparatus 900 is illustrated in FIG. 9, where the apparatus 900 comprises a processor 902, connected to a receiving unit 901 and a memory 903, comprising instructions, which when executed by the processor causes the processor 902 to execute the method referred to above. A computer program product 906 may also be provided which comprises computer readable medium and a computer program, where the computer program comprises the instructions referred to above. The memory 903 and/or the computer program product 906 is/are typically arranged as a plurality of interrelated modules, which e.g. may be referred to as a receiving module 904a, a combining module 904b, an encoding module 904c and a transmitting module 9004d.

Figure 10:
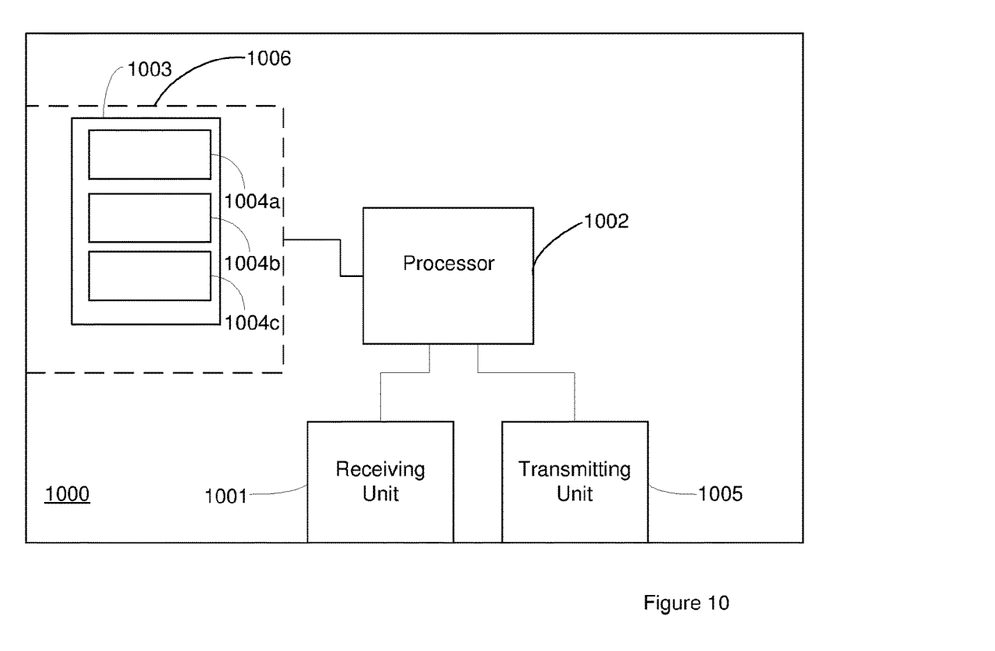
FIG. 10 is another block scheme illustrating a UE suitable for splitting combined files according to a second embodiment.

UE for receiving and processing combined media content may in a corresponding way alternatively be configured such that the method as described above with reference to FIG. 6 is instead executed as executable instructions. Such an alternative apparatus 1000 is illustrated in FIG. 10, where the UE 1000 comprises a processor 1002, connected to a receiving unit 1001 and a memory 1103, comprising instructions, which when executed by the processor 1002 causes the processor 1002 to execute the method referred to above. A computer program product 1006 may also be provided which comprises computer readable medium and a computer program, where the computer program comprises the instructions referred to above. The memory 1103 and/or the computer program product 1006 is/are typically arranged as a plurality of interrelated modules, which e.g. may be referred to as a receiving module 1004a, a decoding module 1004b, and a splitting module 1004c.

The processors 902,1002, mentioned above may be configured as any combination of one or more of a suitable central processing unit (CPU), multiprocessor, microcontroller, or digital signal processor (DSP), capable of executing computer program code stored in a storing unit or computer program product, as suggested above with reference to in FIG. 9 or 10, respectively. The computer program of the apparatus 900 and the UE 1000, respectively, may be stored in a volatile or non-volatile memory, which may be arranged as a computer program product. Such a computer program product may include, but is not limited to, an Electrically Erasable Programmable Read-only Memory (EEPROM), a flash memory, a disk drive, a Read Only Memory (ROM) or a Random access memory (RAM), CDROM, a Digital Versatile Disc (DVD) or any other type of optical disc storage, a magnetic cassette, tape or other type of magnetic disc storage, or any other type of storage medium which is accessible by the respective processor 902,1002.

Alternatively the apparatus and/or UE may be configured as a combination of hardware and software as described above.

Although, the exemplary embodiments provided herein refers to MBMS based networks applying the UDP/FLUTE and DASH standards, it is to be understood that the described file combination and associated file splitting mechanisms may be applied in association with distribution of any type of streamed media content, distributed via UDP, as long as combined files can be combined on the server side and split up on the client side, and described in a respective modified manifest file as described herein. As used herein, the singular forms "a", "an" and "the" are intended to include the plural forms as well, unless the context clearly indicates otherwise. It is also to be understood that units, such as e.g. "splitting unit" or "combining unit" are mentioned as exemplifying units only, which may alternatively be denoted differently and/or configured as combinations, including other functionalities. In addition, even though the apparatus and UE respectively are described either as a hardware configuration or a software configuration above, it is to be understood that the apparatus and/or UE may alternatively be configured as a combination of both according to a number of alternative embodiments.

The invention claimed is:

1. A method executed by an apparatus of a multimedia delivery system when distributing streamed media content via User Datagram Protocol (UDP), the method comprising:
   receiving, from at least one media source, media content distributed in a plurality of files;
   identifying, from the received files, associated files comprising at least one audio file and at least one video file;
   combining the associated files into one source block comprising a single file object comprising a composition of the associated files;
   applying encoding on the one source block, wherein the encoding outputs an encoded source block that does not include data from another source block;
   generating a manifest file describing the content of the one source block to enable a rendering device to reconstruct the associated files from the encoded source block, wherein the manifest file does not describe content of files other than of the one source block, and transmitting the manifest file and the associated encoded source block.

2. The method according to claim 1, wherein the encoding includes, Forward Error Correction (FEC) encoding.

3. The method according to claim 1, wherein the identifying comprises any of:
   identifying at least one audio file and at least one video file associated with the same streaming, wherein the at least one audio file is provided in an audio track and the at least one video file is provided in a video track separated from the audio track, or
   identifying at least one audio file and at least one video file associated with the same streaming on the basis of a pattern providing instructions to combine said at least one audio file and at least one video file.

4. The method according to claim 1, wherein the generating further comprises adding an element describing the combined files to said manifest file, said element being arranged such that its content enable subsequent splitting of the content of the decoded source block into the at least one audio file and at least one video file as originally identified.

5. The method of claim 1, wherein generating the manifest file comprises generating the manifest file as an FDT instance having a file type comprising an element that indicates to a recipient of the FDT instance that a session described by the FDT instance comprises combined content which can be separated into original compositions based on instructions of the FDT instance.

6. A method executed in a user equipment (UE) when receiving streamed media content via User Datagram Protocol (UDP), the method comprising:
   receiving a manifest file and an encoded source block, wherein the manifest file does not describe content of other files other than of the encoded source block;
   identifying, according to content of the manifest file, that the encoded source block is only a single file object comprising a combination of at least one audio file and at least one video file; and
   in response to identifying that the encoded source block is a single file object, reconstructing the at least one audio file and at least one video file using the content of the manifest file to reconstruct the at least one audio file and the at least one video file from the encoded source block by decoding and splitting the source block into said at least one audio file and at least one video file.

7. The method according to claim 6, wherein the decoding and splitting is based on content of an element comprised in the manifest file, the element being arranged such that the respective at least one audio file and at least one video file contained in the source block can be identified.

8. An apparatus of a multimedia delivery system capable of distributing media content via User Datagram Protocol (UDP), the apparatus comprising a processor and a memory comprising instructions which when executed by the processor causes the processor to:
   receive, from at least one media source, media content distributed in a plurality of files;
   identify, from the received files, associated files comprising at least one audio file and at least one video file, to initiate a combining unit to combine the associated files into one source block comprising a single file object comprising a composition of the associated files, and to apply encoding to the one source block, wherein the encoding outputs an encoded source block that does not include encoded data from another source block, and generate a manifest file, such that it is describing the content of the encoded source block to enable a rendering device to reconstruct the associated files from the encoded source block, wherein the manifest file does not describe content of files other than of the one source block, and to transmit the encoded source block and the manifest file, via a transmitting unit.

9. The apparatus according to claim 8, further comprising instructions which when executed by the processor causes the apparatus to execute FEC encoding.

10. The apparatus according to claim 8, further comprising instructions which when executed by the processor causes the apparatus to:
identify at least one audio file and at least one video file associated with the same streaming, wherein the at least one audio file is provided in an audio track and the at least one video file is provided in a video track separated from the audio track, or
identify at least one audio file and at least one video file associated with the same streaming on the basis of a pattern providing instructions to combine said at least one audio file and at least one video file.

11. The apparatus according to claim 8, further comprising instructions which when executed by the processor causes the apparatus to add an element to the manifest file when generating the manifest file, said element being arranged such that its content enable subsequent splitting of content of the decoded source block into the at least one audio file and at least one video file as originally identified.

12. The apparatus according to claim 8, further comprising instructions which when executed by the processor causes the apparatus to distribute media content according to the Hypertext Transfer Protocol (HTTP) streaming protocol.

13. The apparatus according to claim 12, wherein the apparatus is or form part of a Broadcast Multicast Service Center (BM-SC).

14. The apparatus according to claim 8, further comprising instructions which when executed by the processor causes the apparatus to provide the manifest file as an FDT instance.

15. The apparatus according to claim 14 wherein the FDT instance has a file type comprising an element that indicates to a recipient of the FDT instance that a session described by the FDT instance comprises combined content which can be separated into original compositions based on instructions of the FDT instance.

16. The apparatus according to claim 8, further comprising instructions which when executed by the processor causes the apparatus to deliver media content via User Datagram Protocol/File delivery over Unidirectional Transport (UDP/FLUTE).

17. A user equipment (UE) capable of receiving streamed media content distributed via User Datagram Protocol (UDP), the UE comprising a processor and a memory comprising instructions which when executed by the processor causes the processor to:
receive a manifest file and an encoded source block, wherein the manifest file does not describe content of other files other than of the encoded source block;
identify, according to content of the manifest file, that the source block is only a single object file comprising a combination of at least one audio file and at least one video file; and
in response to identifying that the source block is a single object file, reconstruct the at least one audio file and at least one video file using the content of the manifest file to reconstruct the at least one audio file and the at least one video file from the encoded source block by initiating decoding of the encoded source block and splitting of the source block into said at least one audio file and at least one video file.

18. The UE according to claim 17, further comprising instructions which when executed by the processor causes the UE to execute FEC decoding.

19. The UE according to claim 17, further comprising instructions which when executed by the processor causes the UE to provide the at least one audio file and at least one video file into a storing unit of the UE.

20. The UE according to claim 17, further comprising instructions which when executed by the processor causes the UE to present a video on a media player on the basis of the at least one audio file and at least one video file.

21. The UE according to claim 17, further comprising instructions which when executed by the processor causes the UE to receive media content according to the Hypertext Transfer Protocol (HTTP) streaming protocol.

22. The UE according to claim 17, further comprising instructions which when executed by the processor causes the UE to provide to receive media content delivered via User Datagram Protocol/file delivery over Unidirectional Transport (UDP/FLUTE).

* * * * *